United States Patent Office 3,705,242
Patented Dec. 5, 1972

3,705,242
ADAMANTYLAMINO (AND PIPERAZINO) - 5,11-DIHYDRODIBENZO[b,e][1,4]THIAZEPINES AND METHOD OF USING
Harry Louis Yale, New Brunswick, N.J., assignor to E. R. Squibb & Sons, Inc., New York, N.Y.
No Drawing. Filed Apr. 13, 1970, Ser. No. 28,101
Int. Cl. A61u 27/00
U.S. Cl. 424—250                                              4 Claims

ABSTRACT OF THE DISCLOSURE

Adamantylamino (or piperazino)-5,11-dihydrodibenzo[b,e][1,4]thiazepines are provided which have been found to have an inhibitory effect on DNA synthesis as well as central nervous system stimulant activity and therefore are useful as anti-depressants. In addition, a method is provided for treating depression by administering the above-mentioned compounds as well as the corresponding adamantylamino (or piperazino)-5,11-dihydrodibenz[b,e][1,4]oxazepines.

---

This invention relates to new compounds of the formula:

(I)

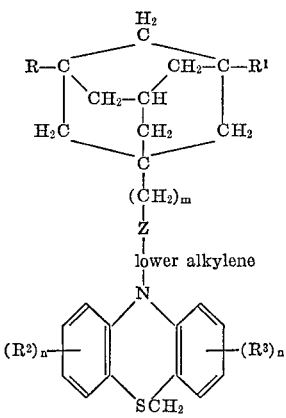

and to acid-addition and quaternary ammonium salts thereof.

In Formula I, R and $R^1$ each is hydrogen, halo, lower alkyl, phenyl, or lower alkoxy. $R^2$ is hydrogen, halo or trifluoromethyl. $R^3$ is hydrogen, halogen, trifluoromethyl, lower alkyl, lower alkoxy, dimethylsulfamyl, trifluoromethylmercapto and trifluoromethoxy; $m$ is 0, 1 or 2 and $n$ is 1, 2 or 3; Z represents a nitrogen containing group such as (II)

wherein $R^4$ is hydrogen or lower alkyl, or a nitrogen heterocyclic such as piperazino or carbon substituted piperazino, e.g., lower alkylpiperazino such as 2- or 3-methylpiperazino, and di-lower-alkylpiperazino such as 2,5-dimethylpiperazino, the attachment to the alkylene group being through a nitrogen atom.

The halogens represented by R, $R^1$, $R^2$ and $R^3$ include chlorine, bromine, iodine and fluorine, but the first two are preferred. Lower alkyl groups represented by the symbols include straight and branched chain aliphatic groups having from one to about eight carbon atoms, such as methyl, ethyl, propyl, isopropyl, butyl, isobutyl, t-butyl, amyl, isoamyl, hexyl, heptyl, octyl, and the like. Methyl and ethyl are preferred. The lower alkoxy groups are ether groups having alkyl groups of the foregoing character attached to the oxygen.

The lower alkylene groups are straight or branched chain, divalent aliphatic hydrocarbon groups of the same type as the lower alkyl groups referred to above. Two to three carbon chains are preferred.

The new compounds of this invention may be produced by a variety of methods. According to one method, a substituted adamantylamine, i.e., one in which R, $R^1$ or $R^4$ are hydrogen or any of the other substituents represented by the respective symbols, is reacted with a haloacyl halide to obtain a haloalkanoyl adamantylamine which is reduced, e.g., with lithium aluminum hydride, to the corresponding adamantylaminoalkyl halide. This is then reacted with a substituted or unsubstituted 5,11-dihydrodibenzo[b,e][1,4]thiazepine to obtain the product of Formula I.

Alternatively, the same starting material is converted to an adamantylamino alkanol, e.g., with an alkylene oxide such as ethylene oxide or the like, and the alkanol is converted to the corresponding alkyl halide, e.g., with a thionyl halide such as thionyl chloride or thionyl bromide. This product is then reacted with a substituted or unsubstituted 5,11-dihydrodibenzo[b,e][1,4]thiazepine to obtain the same product as by the first procedure.

Suitable starting materials for compounds of Formula I include, for example, 1-adamantylamine, 3-methyl-1-adamantylamine, 3-phenyl-1-adamantylamine, 3-methoxy-1-adamantylamine, 3-fluoro-, 3-chloro-, 3-bromo- and 3-iodo - 1 - adamantylamine, 3,5-dimethyl - 1 - adamantylamine as well as the adamantyl-loweralkylamines and N-alkyl compounds corresponding to the above.

These amines may be prepared by the reduction of an N-acyl-adamantylamine such as N-(1-adamantyl)acetamide with lithium aluminum hydride or by the alkylation of an adamantylamine such as 1-adamantylamine with an alkyl halide such as methyl iodide.

A further alternate synthesis comprises reacting an N-alkylacylamide, such as N-ethylacetamide, with a halo-adamantane such as 1-bromoadamantane and hydrolyzing the N-ethyl - N - (1-adamantyl)-acetamide to the corresponding N-ethyl-1-adamantylamine.

Reduction of an adamantylcarboxamide such as N-methyl - 1 - adamantylcarboxamide, with lithium aluminum hydride yields suitable starting amines for those derivatives in which $m$ is 1. Similarly, the reduction of an adamantylacetamide yields derivatives in which $m$ is 2.

Dihydrodibenzothiazepines which may be utilized to produce compounds of Formula I include, for example, 5,11-dihydrodibenzo[b,e][1,4]thiazepine,
3-chloro-5,11-dihydrodibenzo[b,e][1,4]thiazepine,
3-trifluoromethyl-5,11-dihydrodibenzo[b,e][1,4]thiazepine,
7-methyl-5,11-dihydrodibenzo[b,e][1,4]thiazepine,
3,7-dichloro-5,11-dihydrodibenzo[b,e][1,4]thiazepine,
7-methoxy-5,11-dihydrodibenzo[b,e][1,4]thiazepine,
3-trifluoromethoxy-5,11-dihydrodibenzo[b,e][1,4]thiazepine,
3-trifluoromethylmercapto-5,11-dihydrodibenzo[b,e][1,4]thiazepine, and
3-dimethylsulfamyl-5,11-dihydrodibenzo[b,e][1,4]thiazepine.

Preferred compounds of this invention are those wherein Z represents -N-methyl or piperazinyl, the lower alkylene group has 2 to 3 carbon atoms and R, $R^1$, $R^2$, and $R^3$ are all hydrogen.

The bases of Formula I form acid-addition salts with a variety of inorganic and organic acids. Such salts include, for example, the hydrohalides, e.g., hydrochloride, hydrobromide, etc., sulfate, phosphate, nitrate, aryl-sulfonates, e.g., camphorsulfonate, benzenesulfonate, toluenesulfonate, etc., citrate, oxalate, ascorbate, maleate, fumarate, pamoate, acetate, tartrate, salicylate and the like. It is frequently convenient to isolate the compound by forming the acid salt and precipitating in a medium in which it is insoluble. The free base may then be obtained by neutralization. The bases also form quaternary ammonium salts with quaternizing agents which are acceptable for pharmaceutical use, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl chloride, benzyl sulfate, etc. This is accomplished by reacting the base with the alkyl halide, sulfate or the like.

The new compounds of this invention have activity upon the central nervous system and are especially active as anti-depressants. In addition, the new compounds have anti-inflammatory activity and may be used to decrease joint swelling, tenderness, pain and stiffness in mammalian species, e.g., in conditions such as rheumatoid arthritis or osteo arthritis. They are useful in the alleviation of depressed states and in treating arthritic disease in mammalian species, e.g., rats, dogs or cats. They may be administered orally or parenterally in the form of tablets, capsules, elixirs, injectables or the like by incorporating the appropriate dosage of the base of Formula I or a physiologically acceptable acid-addition salt or quarternary ammonium salt thereof, e.g., about 10 to 500 mg., preferably about 25 to 200 mg., per day in two to four divided doses, in a conventional vehicle together with excipients, lubricants, preservatives, stabilizers and the like, according to accepted pharmaceutical practice.

In addition, in accordance with the present invention a method is provided for treating depression and/or arthritis in mammals by administering to said mammals an anti-depressively and/or anti-inflammatorily effective amount (as indicated in the previous paragraph) of an adamantylamino (or piperazino) - 5,11 - dihydrodibenzo[b,e][1,4]thiazepine of the invention or an adamantylamino (or piperazino)-5,11-dihydrobenz[b,e][1,4]oxazepine, or physiologically acceptable acid-addition salts or quaternary ammonium salts thereof.

The adamantylamino (or piperazino)-5,11-dihydrodibenz[b,e][1,4]oxazepines have the formula (III)

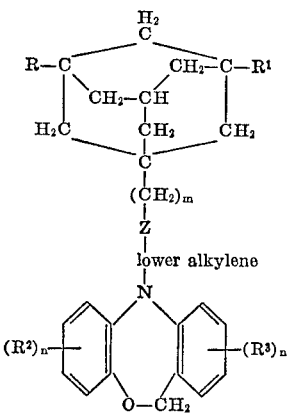

wherein R, R¹, R², R³, Z, m, n and lower alkylene are as defined hereinbefore with respect to the corresponding thiazepines. Examples of such oxazepine compounds include 5-[3-(N-methyl-1-adamantylamino)propyl]-5,11-dihydrodibenz[b,e][1,4]oxazepine and its hydrochloride,
5-[2-(N-methyl-1-adamantylamino)ethyl]-5,11-dihydrodibenz[b,e][1,4]oxazepine and its maleic acid salt,
5-[2-(N-ethyl-3-methyl-1-adamantylamino)ethyl]-5,11-dihydrodibenz[b,e][1,4]oxazepine and its maleic acid salt,
5-[3-(N-methyl-3-methoxy-1-adamantylamino)propyl]-5,11-dihydrodibenz[b,e][1,4]oxazepine and its maleic acid salt,
5-{3-[4-(1-adamantylmethyl)-1-piperazinyl]propyl}-5,11-dihydrodibenz[b,e][1,4]oxazepine and its dihydrochloride and
5-[3-(1-adamantylamino)propyl]-3-trifluoromethyl-5,11-dihydrodibenz[b,e][1,4]oxazepine.

The adamantylamino (or piperazino)-5,11-dihydrodibenz[b,e][1,4]oxazepines can be administered in the same manner (including dosages) as described above with respect to the corresponding thiazepines.

The above oxazepines can be prepared as described in U.S. Pat. No. 3,338,900, dated Aug. 29, 1967.

EXAMPLE 1

Preparation of 5-[3-(1-adamantylamino)propyl] - 3 - trifluoromethyl-5,11 - dihydrodibenzo[b,e][1,4]thiazepine hydrochloride (A) Preparation of N-(1-adamantyl)-3-chloropropionamide.—With ice-cooling and stirring, 37.1 grams of β-chloropropionyl chloride in 100 ml. of anhydrous benzene is added dropwise to 100 grams of 1-(amino)adamantane in 200 ml. of anhydrous benzene. The reaction mixture is then refluxed for 5 hours, filtered and the filtrate washed with water and dried over anhydrous magnesium sulfate. The ether is removed by distillation from the N-(1-adamantyl) - 3 - chloropropionamide, and this product may be used without further purification. If desired, the product may be purified by fractional distillation.

(B) Preparation of N-(3-chloropropyl)-1-adamantylamine.—To 3.8 grams of lithium aluminum hydride in 200 ml. of anhydrous ether is added dropwise a solution of 25 grams of N-(1-adamantyl)-3-chloropropionamide in 400 ml. of anhydrous ether. The mixture is then refluxed for 1 hour, cooled in ice, treated with 2.5 ml. of water and then 2.5 ml. of 20% aqueous sodium hydroxide. The mixture is filtered and dried over anhydrous potassium carbonate. The ether is removed by distillation and the residue is fractionally distilled under reduced pressure to yield the desired N-(3-chloropropyl)-1-adamantylamine.

(C) Preparation of 5-[3-(1-adamantylamino)propyl]-3-trifluoromethyl - 5,11 - dihydrodibenzo[b,e][1,4]thiazepine hydrochloride.—A mixture of 7.0 grams of 3-trifluoromethyl-5,11-dihydrodibenzo[b,e][1,4]thiazepine, 1.5 grams of a 50% dispersion of sodium hydride in mineral oil and 50 ml. of tetrahydrofuran is stirred for 1 hour while nitrogen is bubbled through the mixture. To this mixture there is added dropwise with vigorous stirring a solution of 18 grams of N-(3-chloropropyl)-1-adamantylamine in tetrahydrofuran. The reaction mixture is refluxed for 3 hours and filtered. The filtrate is concentrated, dissolved in ether and extracted with 10% phosphoric acid. The acid extracts are made basic and extracted with ether. The ether extracts are dried over anhydrous magnesium sulfate and concentrated to yield the desired 5-[3-(1-adamantylamino)propyl] - 3 - trifluoromethyl-5,11-dihydrodibenzo[b,e][1,4]thiazepine.

To a cooled solution of the base in anhydrous ether, there is added an equivalent amount of an ethereal solution of hydrogen chloride. The precipitated solid is filtered and recrystallized from a mixture of ethanol and anhydrous ether to yield the hydrochloride salt of 5-[3-(1-adamantylamino)propyl] - 3 - trifluoromethyl-5,11-dihydrodibenzo[b,e][1,4]thiazepine.

EXAMPLE 2

5-[3-(1-adamantylamino)propyl-3-chloro-5,11-dihydrodibenzo[b,e][1,4]thiazepine

Following the procedure of Example 1 but substituting 3-chloro-5,11-dihydrodibenzo[b,e][1,4]thiazepine for the 3-trifluoro-5,11-dihydrodibenzo[b,e][1,4]thiazepine there is obtained the above-titled compound.

EXAMPLE 3

Preparation of 5-[2-(N-methyl-1-adamantylamino)ethyl]-5,11-dihydrodibenzo[b,e][1,4]thiazepine, maleic acid salt (A) Preparation of 2-(N-methyl-1-adamantylamino) ethanol.—A 140 ml. stainless steel bomb is charged with 16.5 grams of N-methyl-1-adamantylamine, 5.0 grams of ethylene oxide and 50 ml. of anhydrous tetrahydrofuran and heated at 70° for 12 hours. The solvent is removed by distillation and the residue fractionally distilled to yield the desired 2-(N-methyl-1-adamantylamino)ethanol.

(B) Preparation of N-(2-bromoethyl) - N - methyl-1-adamantylamine hydrobromide.—A solution of 20.9 grams of 2-(N-methyl-1-adamantylamino)ethanol in 100 ml. of chloroform is cooled to 0° and a solution of 30 grams of thionyl bromide in 150 ml. of chloroform added dropwise with vigorous stirring, while the temperature is maintained at 0–5°. The reaction mixture is then allowed to warm to room temperature, diluted with anhydrous ether and filtered to recover the N-(2-bromoethyl)-N-methyl-1-adamantylamine, hydrobromide. This may be recrystallized from a mixture of ethanol and ether.

(C) Preparation of 5-[2-(N-methyl-1-adamantylamino) ethyl] - 5,11-dihydrodibenzo[b,e][1,4]thiazepine, maleic acid salt.—A mixture of 5.3 grams of 5,11-dihydrodibenzo [b,e][1,4]thiazepine, 1.5 grams of a 50% dispersion of sodium hydride in mineral oil and 50 ml. of tetrahydrofuran is stirred for 1 hour, while nitrogen is allowed to bubble through the mixture. To this mixture there is then added dropwise with vigorous stirring a solution of 20 grams of N-(2-bromoethyl)-N-methyl-1-adamantylamine in tetrahydrofuran. The reaction mixture is then refluxed for 3 hours and filtered. The filtrate is concentrated, dissolved in ether and extracted with 10% phosphoric acid. The acid extracts are made basic and extracted with ether. The ether extracts are dried over anhydrous magnesium sulfate and concentrated to yield the desired 5-[2 - (N-methyl-1-adamantylamino)ethyl] - 5,11 - dihydrodibenzo[b,e][1,4]thiazepine.

To a solution of the base in anhydrous ether there is then added a solution of maleic acid in acetone. The addition of ether completes the precipitation of the salt, which may be recrystallized from a mixture of ethanol and ether.

EXAMPLE 4

5-[3-(1-adamantylamino)propyl] - 5,11 - dihydro-7-(trifluoromethyl)dibenzo[b,e][1,4]thiazepine, hydrochloride To a stirred solution, under nitrogen, of 1.7 g. of 5,11-dihydro - 7 - (trifluoromethyl)dibenzo[b,e][1,4]thiazepine and 4.1 g. of trimethylene chlorobromide in 50 ml. of ethyl methyl ketone is added 2.1 g. of powdered sodium hydroxide. The suspension is brought to reflux and after 6 hours of refluxing an additional 2.1 g. of powdered sodium hydroxide is added and the refluxing continued for 17 hours. After cooling to room temperature, 10 ml. of water is added and stirred until all solids are dissolved. The organic layer is separated and the water layer is extracted with two 15 ml. portions of fresh solvent. The combined extracts are washed with two 15 ml. portions of saturated sodium chloride solution, dried, filtered with suction, and used in the next step.

To a solution of 2.5 g. of 1-adamantylamine hydrochloride in 10 ml. of water is added 1.5 ml. of 50% aqueous sodium hydroxide. The precipitated base is dissolved in 20 ml. of ethyl methyl ketone, the layers are separated, the organic layer is washed with 15 ml. of saturated aqueous sodium chloride solution, dried, and filtered. To this filtrate of 1-adamantylamine is added the above ethyl methyl ketone solution, 0.97 g. of solid sodium iodide, and the reaction mixture brought to reflux. After 40 hours of refluxing the solvent is removed in vacuo. To the residue is added 10 ml. of water and extracted with two 100 ml. portions of ether. The combined ether extracts are washed with water until the washings are neutral and are then extracted with two 60 ml. portions of 10% aqueous hydrochloric acid. The yellow colored ether layer is left overnight in the cold room, and the precipitated solid filtered. The yield of product is 2.1 g., M.P. about 260–262°. The filtrate is concentrated to one third volume yielding 0.3 g. of additional product, M.P. 260–262°.

EXAMPLE 5

5-[3-(1-adamantylamino)propyl]-7-chloro-5,11-dihydrodibenzo[b,e][1,4]thiazepine, hydrochloride A mixture of 1.5 g. of 7-chloro-5,11-dihydrodibenzo-[b,e][1,4]thiazepine, 50 ml. of reagent grade ethyl methyl ketone, 4.1 g. of trimethylene chlorobromide, and 2.1 g. of powdered sodium hydroxide is stirred and heated at reflux temperature in an atmosphere of nitrogen for 6 hours. An additional 2.1 g. of powdered sodium hydroxide is added and the mixture is stirred at reflux temperature for 18 hours. After cooling, 10 ml. of water is added with stirring to dissolve all of the solid. The aqueous layer is separated and extracted twice with 15 ml. portions of ethyl methyl ketone. The ketone solutions are combined, washed with 15 ml. of saturated sodium chloride solution, and dried. After filtration, the solvent is removed. The residue (3.0 g.) is taken up in 30 ml. of ethyl methyl ketone and added to a solution of 2.0 g. of 1-adamantylamine in 50 ml. of ethyl methyl ketone. After the addition of 0.97 g. of sodium iodide, the reaction mixture is heated at reflux temperature, with stirring and in an atmosphere of nitrogen, for 48 hours. The resulting suspension is filtered and the filtrate is taken to dryness. The residue and 20 ml. of water and 50 ml. of ether are shaken in a separatory funnel and the ethereal layer is removed. The aqueous layer is extracted twice with 25 ml. portions of ether. The ether solutions are combined, washed with 15 ml. of saturated sodium chloride solution, and extracted with 2 portions of 60 ml. of 10% hydrochloric acid. An oil which separates from the aqueous acid-ether mixture solidifies on standing and is recovered by filtration. The solid is covered with ether, and the mixture made strongly alkaline by the addition of 50% sodium hydroxide solution. The ether solution is separated, dried, and ethereal hydrogen chloride is added until the reaction mixture is strongly acidic. The oil which separates from solution crystallizes and is filtered to yield 1.0 g., M.P. 230–232° (dec.). Recrystallization from propionitrile gives 0.6 g., M.P. 234–236° (dec.).

EXAMPLES 6 TO 13

Following the procedure of Example 3 but substituting the indicated dihydrodibenzothiazepine for the 5,11-dihydrodibenzo[b,e][1,4]thiazepine in part (C), there is formed the designated 5 - [2 - (N - methyl - 1 - adamantylamino)ethyl] - $R^2$, $R^3$ - 5,11 - dihydrodibenzo[b,e] [1,4]thiazepine, maleic acid salt.

| Reactant | Product |
|---|---|
| Example: | |
| 6 — 3-chloro-5,11-dihydrodibenzothiazepine | $R_2$=3-Cl; $R_3$=H |
| 7 — 3-trifluoromethyl-5,11-dihydrodibenzothiazepine | $R_2$=3-CF$_3$; $R_3$=H |
| 8 — 7-methyl-5,11-dihydrodibenzothiazepine | $R_2$=H; $R_3$=7-CH$_3$ |
| 9 — 3,7-dichloro-5,11-dihydrodibenzothiazepine | $R_2$=3-Cl; $R^3$=7-Cl |
| 10 — 7-methoxy-5,11-dihydrodibenzothiazepine | $R_2$=H; $R_3$=7-CH$_3$O |
| 11 — 3-trifluoroethoxy-5,11-dihydrodibenzothiazepine | $R_2$=CF$_3$O; $R_3$=H |
| 12 — 3-trifluoromethylmercapto-5,11-dihydrodibenzothiazepine | $R_2$=CF$_3$–S; $R_3$=H |
| 13 — 3-dimethylsulfamyl-5,11-dihydrodibenzothiazepine | $R_2$=(CH$_3$)$_2$NSO$_2$; $R_3$=H |

EXAMPLE 14

Preparation of 5 - [2 - (N - ethyl - 3 - methyl - 1 - adamantylamino)ethyl] - 5,11 - dihydrodibenzo[b,e][1,4]thiazepine, maleic acid salt (A) Preparation of 1 - ethylamino - 3 - methyladamantane.—A mixture of 60 grams of N-ethylacetamide, 45 grams of 1-bromo-3-methyladamantane and 60 grams of silver sulfate is heated at 100° for 1 hour. The cooled mixture is treated with 100 ml. of water and extracted with ether. The ether extracts are combined, dried over anhydrous magnesium sulfate and concentrated under reduced pressure to yield 1-(N-ethylacetamido)-3-methyladamantane.

A mixture of 12 grams of 1-(N-ethylacetamido)-3-methyladamantane, 12 grams of sodium hydroxide and 120 ml. of diethylene glycol is refluxed for 5 hours. The cooled mixture is poured into 1 liter of water and extracted with ether. The combined ether extracts are dried over anhydrous potassium carbonate and the ether then removed by distillation to yield the 1-ethylamino-3-methyladamantane.

(B) Preparation of 5 - [2 - (N - ethyl - 3 - methyl-1 - adamantylamino) - ethyl] - 5,11 - dihydrodibenzo[b,e][1,4]thiazepine, maleic acid salt.—Following the procedure of Example 3 but substituting an equivalent amount of the 1 - ethylamino - 3 - methyladamantaneamine for the N - methyl - 1 - adamantylamine in part (A), there is obtained 5 - [2 - (N - ethyl - 3 - methyl-1 - adamantylamino)ethyl] - 5,11 - dihydrodibenzo[b,e][1,4]thiazepine, maleic acid salt.

EXAMPLE 15

Preparation of 5 - [3 - (N - methyl - 3 - methoxy - 1 - adamantylmethylamino) - propyl] - 5,11 - dihydrodibenzo[b,e][1,4]thiazepine hydrochloride (A) Preparation of N - methyl - 3 - methoxy - 1 - adamantanecarboxamide.—A mixture of 10 grams of 3-methoxy - 1 - adamantanecarboxylic acid and 20 ml. of thionyl chloride are heated under reflux for 30 minutes. The excess thionyl chloride is removed by distillation under reduced pressure. Ten ml. of anhydrous benzene is added and the benzene removed by distillation under reduced pressure. The cooled residue is treated with a solution of methylamine in benzene. After several hours, the precipitated solid is removed by filtration, and the filtrate concentrated under reduced pressure to yield N-methyl-3-methoxy-1-adamantanecarboxamide.

(B) Preparation of N - (3 - methoxy - 1 - adamantylmethyl)methylamine.—A solution of 10 grams of N-methyl-3-methoxy - 1 - adamantanecarboxamide in anhydrous ether is added slowly to a suspension of lithium aluminum hydride in anhydrous ether. After the addition is completed, the reaction mixture is heated to gentle reflux for 4 hours and is then cooled. Water is added dropwise to decompose the unreacted lithium aluminum hydride, followed by a 10% sodium hydroxide solution. The precipitated solids are removed by filtration and washed with ether. The combined ether solutions are dried over anhydrous magnesium sulfate and concentrated under reduced pressure to yield the N-(3-methoxy-1-adamantylmethyl)methylamine.

(C) Preparation of 5 - [3 - (N - methyl - 3 - methoxy-1 - adamantylmethylamino)propyl] - 5,11 - dihydrodibenzo[b,e][1,4]thiazepine hydrochloride.—Following the procedure of Example 1 but substituting an equivalent amount of N - (3 - methoxy - 1 - adamantylmethyl)methylamine for the 1-aminoadamantane in part (A), there is obtained 5 - [3 - (N - methyl - 3 - methoxy - 1 - adamantylmethylamino)propyl] - 5,11 - dihydrodibenzo[b,e][1,4]thiazepine hydrochloride.

Similarly, by replacing the 3-methoxy-1-adamantanecarboxylic acid with an equivalent amount of 3-phenyl-1-adamantanecarboxylic acid in part (A), there is obtained 5 - [3 - (N - methyl - 3 - phenyl - 1 - adamantylmethylamino)propyl] - 5,11 - dihydrodibenzo[b,e][1,4]thiazepine hydrochloride. Replacement with 3-bromo-1-adamantanecarboxylic acid yields the corresponding 5-[3-(N-methyl - 3 - bromo - 1 - adamantylmethylamino)propyl]-5,11-dihydrodibenzo[b,e][1,4]thiazepine hydrochloride.

EXAMPLE 16

Preparation of 5 - {3 - [4 - (1 - adamantylmethyl) - 1-piperazinyl]propyl} - 5,11 - dihydrodibenzo[b,e][1,4]thiazepine dihydrochloride (A) Preparation of 4 - (1 - adamantanecarbonyl) - 1-benzylpiperazine hydrochloride.—A solution of 99 grams of 1-adamantanecarboxylic acid chloride in 1 liter of anhydrous benzene is added dropwise with vigorous stirring to a solution of 88 grams of N-benzylpiperazine in 1 liter of anhydrous benzene. The reaction mixture is then heated to reflux for 2 hours and cooled. Anhydrous ether is added to complete the precipitation of the hydrochloride of 4 - (1 - adamantanecarbonyl) - 1 - benzylpiperazine. This is purified by crystallization from a mixture of absolute alcohol and anhydrous ether.

(B) Preparation of 1-(1-adamantanecarbonyl)piperazine.—To a solution of 20 grams of 4-(1-adamantanecarbonyl)-1-benzylpiperazine hydrochloride in 100 ml. of glacial acetic acid there is added 5 grams of 5% palladium on carbon catalyst and the mixture shaken in an atmosphere of hydrogen under 50 p.s.i. initial pressure until the theoretical amount of hydrogen has been absorbed. The mixture is then filtered and the acetic acid removed by distillation under reduced pressure to yield the hydrochloride of 1-(1-adamantanecarbonyl)piperazine. This hydrochloride is purified by crystallization from a mixture of absolute alcohol and anhydrous ether.

The purified hydrochloride is dissolved in water and the aqueous solution saturated with potassium carbonate. The mixture is then extracted several times with anhydrous ether, the ether extracts combined, dried over solid potassium carbonate and then concentrated under reduced pressure to yield the desired 1-(1-adamantanecarbonyl)piperazine.

(C) Preparation of 1 - (1 - adamantylmethyl)piperazine.—To a suspension of 3.8 grams of lithium aluminum hydride in 200 ml. of anhydrous ether is added dropwise a solution of 15 grams of 1-(1-adamantanecarbonyl)piperazine in 400 ml. of anhydrous ether. The mixture is then refluxed for 1 hour, cooled in ice and treated with 2.5 ml. of water followed by 2.5 ml. of 20% aqueous sodium hydroxide. The mixture is filtered and dried over anhydrous potassium carbonate. The ether is removed by distillation and the residue is fractionally distilled under reduced pressure to yield the desired 1-(1-adamantylmethyl)piperazine.

(D) Preparation of 3-[4-(1 - adamantylmethyl)-1-piperazinyl]propyl chloride.—To a solution of 31.5 grams of trimethylene chlorobromide in 150 ml. of anhydrous ether there is added dropwise with vigorous stirring and cooling (0–5°) a solution of 88 grams of 1-(1-adamantylmethyl)piperazine in anhydrous ether. The mixture is then refluxed gently for 6 hours and cooled. The hydrobromide of 1-(1-adamantylmethyl)piperazine is removed by filtration and the filtrate is treated with 150 ml. of 20% hydrochloric acid. The acid extract is cooled, made basic by the careful addition of solid potassium carbonate and extracted several times with ether. The combined ether extracts are dried over anhydrous potassium carbonate and concentrated. The residue is distilled under reduced pressure to yield the desired 3-[4-(1-adamantylmethyl)-1-piperazinyl]propyl chloride.

(E) Preparation of 5-{3-[4-(1 - adamantylmethyl)-1-piperazinyl]propyl}-5,11-dihydrodibenzo[b,e][1,4]thiazepine dihydrochloride.—Following the procedure of Example 1(C), but substituting an equivalent quantity of 3-[4-(1-adamantylmethyl)-1-piperazinyl]propyl chloride for the N-(3-chloropropyl-1-adamantylamine), there is obtained 5-{3-[4-(1 - adamantylmethyl)-1-piperazinyl]propyl} - 5,11 - dihydrodibenzo[b,e][1,4]thiazepine dihydrochloride.

Similarly, by substituting 1-adamantylacetyl chloride for the 1-adamantanecarboxylic acid chloride in part (A) and following the procedure of Example 16, there is obtained 5-{3-[4-(2-[1-adamantyl]ethyl)-1-piperazinyl]propyl} - 5,11 - dihydrodibenzo[b,e][1,4]thiazepine dihydrochloride.

Additional compounds of Formula I may be similarly synthesized by the foregoing procedures by utilizing other appropriately substituted starting materials.

What is claimed is:

1. A method of treating depression in a host subject, which comprises administering to a host in a depressed state an antidepressively effective amount of a compound of the formula

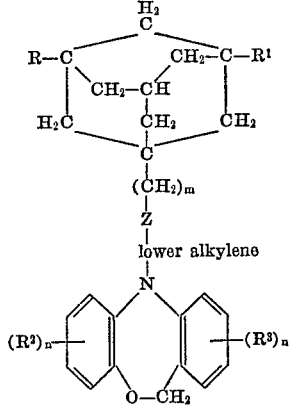

wherein R and $R^1$ each is a member of the group consisting of hydrogen, halo, lower alkyl, phenyl and lower alkoxy, $R^2$ is a member of the group consisting of hydrogen, halo and trifluoromethyl, $R^3$ is a member of the group consisting of hydrogen, halo, trifluoromethyl, lower alkyl, lower alkoxy, dimethylsulfamyl, trifluoromethylmercapto and trifluoromethoxy, Z is a member of the group consisting of amino, lower alkylamino, piperazino, lower alkyl piperazino and di-lower alkylpiperazino, $m$ is an integer from 0 to 2 and $n$ is an integer from 1 to 3, and acid-addition and quaternary ammonium salts thereof.

2. A method in accordance with claim 1 wherein the compound administered is 5-[3-(1-adamantylamino)propyl]-3-trifluoromethyl - 5,11 - dihydrodibenzo[b,e,][1,4]thiazepine.

3. A method in accordance with claim 1 wherein the compound administered is 5-[3-(1-adamantylamino)propyl]-3-chloro-5,11-dihydrodibenzo[b,e][1,4]thiazepine.

4. A method in accordance with claim 1 wherein the compound administered is 5-[3-(1-adamantylamino)propyl] - 3 - trifluoromethyl - 5,11 - dihydrodibenz[b,e][1,4]oxazepine.

References Cited

UNITED STATES PATENTS 3,338,900  8/1967  Berstein _____ 260—268 PA

STANLEY J. FRIEDMAN, Primary Examiner

U.S. Cl. X.R.

424—232; 260—268 PC, 268 TRI, 268 PA, 327